United States Patent [19]

Ohwada et al.

[11] Patent Number: 4,750,813

[45] Date of Patent: Jun. 14, 1988

[54] DISPLAY DEVICE COMPRISING A DELAYING CIRCUIT TO RETARD SIGNAL VOLTAGE APPLICATION TO PART OF SIGNAL ELECTRODES

[75] Inventors: Jun-ichi Ohwada, Hitachi; Masaaki Kitazima, Hitachiota; Sakae Someya, Mobara, all of Japan

[73] Assignee: Hitachi, Ltd., Tokyo, Japan

[21] Appl. No.: 16,568

[22] Filed: Feb. 19, 1987

[30] Foreign Application Priority Data

Feb. 28, 1986 [JP] Japan .................................. 51-41809

[51] Int. Cl.[4] .................................................. G02F 1/13

[52] U.S. Cl. ..................................... 350/333; 340/713; 340/814

[58] Field of Search ............................ 350/333, 350 S; 340/713, 765, 784, 814, 805

[56] References Cited

U.S. PATENT DOCUMENTS

| | | | |
|---|---|---|---|
| 3,716,658 | 2/1973 | Rackman | 340/784 X |
| 3,891,307 | 6/1975 | Tsukamoto et al. | 350/333 |
| 4,041,481 | 8/1977 | Sato | 350/333 X |
| 4,142,181 | 2/1979 | Moricca et al. | 340/805 X |
| 4,427,979 | 1/1984 | Clerc et al. | 340/805 |
| 4,649,383 | 3/1987 | Takeda et al. | 340/805 |

FOREIGN PATENT DOCUMENTS 2103003A 2/1983 United Kingdom ................ 350/333

OTHER PUBLICATIONS

National Meeting of the Television Society of Japan, (1983), pp. 121–122.

*Primary Examiner*—Stanley D. Miller
*Assistant Examiner*—Richard Gallivan
*Attorney, Agent, or Firm*—Antonelli, Terry & Wands

[57] ABSTRACT

A display device consisting of a plurality of scanning electrodes, a plurality of signal electrodes, a driving circuit feeding these electrodes with a scanning voltage and a signal voltage applied thereto, display elements having a pair of electrodes opposite to each other, which are disposed on the intersecting portion of the signal electrodes with the scanning electrodes, and switching elements controlling the feeding of one of the electrodes with the signal voltage, depending on the scanning voltage, comprises further a delaying circuit, which retards the timing of applying the signal voltage applied to a part of the signal electrodes, which are distant from the input terminal of the scanning voltage, with respect to the timing of applying the scanning voltage applied to the scanning electrodes.

10 Claims, 8 Drawing Sheets

DISPLAY DEVICE COMPRISING A DELAYING CIRCUIT TO RETARD SIGNAL VOLTAGE APPLICATION TO PART OF SIGNAL ELECTRODES

BACKGROUND OF THE INVENTION

This invention relates to a display device, and in particular to a display device, which is suitable for driving an active matrix liquid crystal display.

According to a prior art method for driving an active matrix liquid display, as described in a report in the meeting materials of the National Meeting of the Television Society of Japan, 1983, P. 121–122, rectangular pulses having a constant pulse width are applied as a scanning voltage to the scanning wiring (horizontal side wiring) for driving electrodes of thin film transistors (hereinbelow abbreviated to TFT elements) in the display portion, while retarding them successively for every line. On the other hand the signal voltage corresponding to the display information in the display portion is applied to the signal wiring (vertical side wiring) driving the gate electrode of the TFT elements in synchronism with the timing of the scanning voltage applied to the scanning wiring.

The timing to apply the scanning voltage and the signal voltage to the TFT elements is different by the line at a time scanning method and by the point at a time scanning method. However, by either of the methods, it is assumed that the rise time $t_r$ and the fall time $t_f$ of the scanning voltage applied to the gate electrode of the TFT elements in the display portion are sufficiently short and that distortions in the waveform are negligible.

However, specifically in the case where a material having a large resistivity is used for the scanning wiring, and in the case where the area of the display portion is increased and the wiring is elongated, both the rise time $t_r$ and the fall time $t_f$ of the scanning voltage are elongated on the side distant from the input terminal of the scanning voltage, what gives rise to distortions in the waveform. Consequently, these distortions in the waveform in the scanning wiring become larger for the pixels with increasing distance from the input terminal of the scanning voltage.

These distortions in the waveform give rise to phenomena that the voltage applied to the gate electrode of the TFT elements is different for every pixel and phenomena that the timing of the pulse for the scanning voltage is shifted from that for the signal voltage. In this way they can be a cause of deterioration of display quality due to inhomogeneity of the display state or a cause of error of display information.

With respect to the points discribed above, in a prior art display device, no attention has been paid to these distortions in the waveform and the timing shift and thus problems such as lowering of the display quality, errors in the display information, etc. have been provoked.

SUMMARY OF THE INVENTION

The object of this invention is to provide a display device permitting to realize excellent characteristics, even if distortions in the waveform of the scanning voltage are produced.

This object can be achieved by optimizing the timing between the scanning voltage and the signal voltage or their voltage levels.

That is, a display device according to this invention comprises delaying means for delaying the application timing of the voltage applied to a certain signal electrode relatively to that applied to another certain signal electrode, which is nearer to the input terminal of the scanning voltage than the former.

DESCRIPTION OF THE PREFERRED EMBODIMENTS

Figure 1:
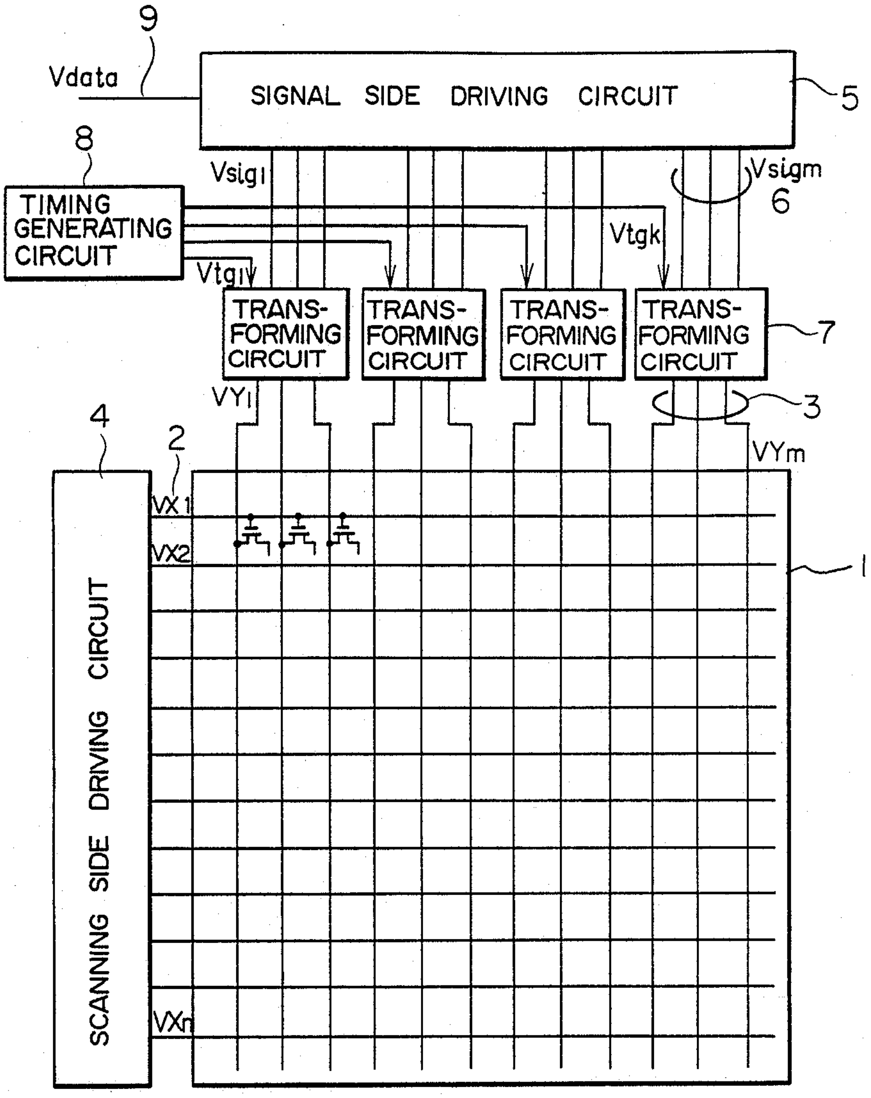
FIG. 1 is a block diagram showing an embodiment of this invention.

Hereinbelow a first embodiment of this invention by the line at a time scanning method will be explained, referring to FIG. 1. The display portion 1 is constituted by a transistor circuit consisting of TFT elements, liquid crystal, which is a displaying body, etc. The scanning side driving circuit 4 is a circuit for applying a scanning voltage to the scanning wiring 2, which consists of scanning electrodes connecting the gate electrodes of the TFT elements in the displaying portion 1. The signal wiring 3 intersects with the scanning wiring 2 and consists of signal electrodes, each of which is connected with each of the drain electrodes of the TFT elements. The signal side driving circuit 5 is a circuit for transforming display data inputted through a display data input line 9 into a signal voltage, which is to be applied to the display portion, corresponding to the scanning voltage. A transforming circuit 7 is a circuit for changing the timing of the feeding of the signal wiring with the signal voltage of an output line 6 of the signal side driving circuit 5 or the magnitude of the signal voltage. A timing generating circuit 8 is a circuit for generating the timing, by which the transforming circuit 7 outputs the signal voltage. The transforming circuit 7 and the timing generating circuit 8 constitute signal delaying means.

In FIG. 1, a first transparent electrode disposed at each of the intersections of the scanning wiring with the signal wiring, at least a second transparent electrode disposed at the portion, which is opposite to the first transparent electrode (usually it is a single common electrode opposing to all the first transparent electrodes), and liquid crystal sealed between the first electrodes and the second electrode are omitted. Further, although the second electrode is usually transparent, it can be opaque for the reflection type liquid crystal. The switching on and off of the TFT elements is controlled by the scanning voltage and when the TFT element is on the on-state, the signal voltage is applied to the first electrode and then when the TFT element is on the off-state, the voltage on the first electrode is held in order to drive the liquid crystal.

In addition, it is also included in the scope of this invention that the scanning side driving circuit 4, the signal side driving circuit 5, the voltage-timing transforming circuit 7, and all or a part of the timing generating circuit 8 are formed in the form of thin film transistors on a glass substrate together with the TFT transistors, etc.

Figure 2:
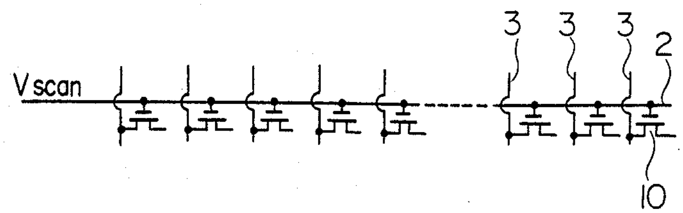
FIG. 2 is a scheme illustrating the circuit construction of a scanning line.
Figure 3:
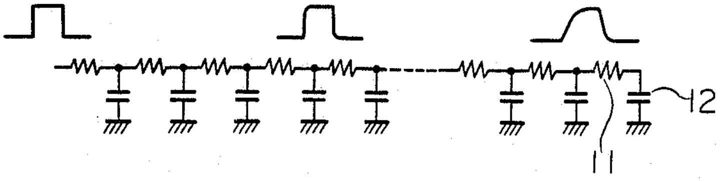
FIG. 3 is a scheme indicating the equivalent circuit of the scanning line.

At first, the waveform of the voltage applied to the scanning wiring 2 will be explained. FIG. 2 indicates a part of the scanning wiring 2 in the display portion corresponding to one line. The gate electrode of the TFT element 10 for each of the pixels is connected with the scanning wiring 2 and the drain electrode of each of the TFT elements is connected with the signal wiring 3, which intersects with the scanning wiring 2. If this circuit is represented by an electric equivalent circuit, it can be expressed by resistors 11 and capacitors 12, as indicated in FIG. 3. The resistors 11 constitute the resistance of the scanning wiring and its value is determined by the material constituting the wiring and the shape of the wiring, such as the width, the length, the thickness, etc. The capacitance of the capacitor 12 has a value obtained by adding the capacitance of the gate electrode of the TFT elements connected to the scanning wiring, the capacitance between the wirings in a two-layered wiring, the capacitance between the two electrodes, which are opposite to each other through the liquid crystal, and the stray capacitance around the scanning wiring, etc. Even if a scanning pulse, which is almost a rectangular wave, whose rise time $t_r$ and fall time $t_f$ are short, is applied, the rise time $t_r$ and the fall time $t_f$ are elongated and the waveform is distorted at the pixels on the right side, which are distant from the input terminal of the scanning voltage, because of the resistance and the capacitance described previously, as indicated above the circuit indicated in FIG. 3.

Figure 4:
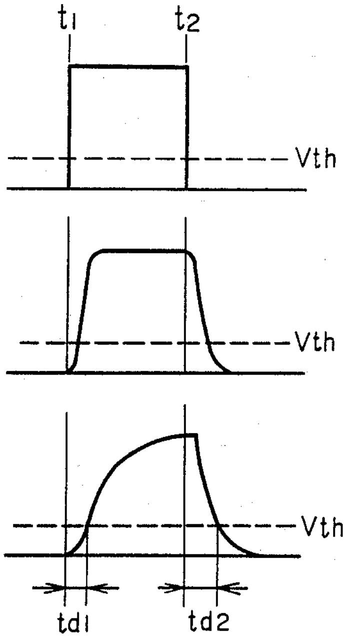
FIG. 4 is a scheme of waveform for explaining the progress of the distortions in the waveform of the scanning voltage.

FIG. 4 shows the progress of the distortions in the waveform of the scanning voltage applied to the scanning wiring, as it propagetes therein. The inputted scanning voltage has a waveform, which rises at a time of point $t_1$ and falls at $t_2$. The rise time $t_r$ and the fall time $t_f$ are sufficiently short and therefore the waveform is almost rectangular. The rise time $t_r$ and the fall time $t_f$ become longer, as this waveform propagates in the scanning wiring. Here, if it is supposed that the TFT element is switched on, when the scanning voltage is over the threshold voltage $V_{th}$ of the TFT element, the period of time, during which the TFT element is switched on, is retarded, what gives rise to delay times $t_{d1}$ and $t_{d2}$. Consider now a case where the display is effected by applying the signal voltage between the points of time $t_1$ and $t_2$. In this case, the voltage is correctly applied at a part of the display portion, which is near to the input terminal of the scanning voltage. However, if the same voltage is applied to pixels, which are distant from the input terminal of the scanning voltage, at the rise the TFT element is turned on, after the delay time $t_{d1}$ has lapsed from the point of time $t_1$, and at the fall it is turned off, after the delay time $t_{d2}$ has lapsed from the point of time $t_2$.

According to the line at a time scanning method, the signal voltage is applied to all the signal lines at once during the application of the scanning voltage. In addition, the voltage between the electrodes of the liquid crystal cell just before the passage from the on-state to the off-state of the TFT element corresponding to each of the liquid crystal cells is held, until the relevant TFT element in the following frame is turned on, and the voltage between the electrodes of the liquid crystal cell is updated, every time the relevant TFT element is turned on. Consequently, the voltage applied to each of the liquid crystal cells depends on the voltage between the electrodes just before the passage from the on-state to the off-state of the corresponding TFT element. Therefore, if there exist distortions in the waveform of the scanning voltage, as described previously, phenomena are produced that the TFT element is not turned off, even if the time has passed the point of time $t_2$, and that the on-state is held, even if it has begun to apply the signal voltage for the following line. For this reason, in a liquid crystal display device, where such phenomena are produced, the signals, which should be displayed for the following line, are held to the following frame and displays are shifted by one line from each other between the portion influenced by the distortions in the waveform and the portion, which is not influenced.

By the point at a time scanning method, since the signal voltage is successively applied to the signal lines during the period of time, during which the scanning voltage is applied to the scanning wiring, when the application of the signal voltage to the signal wiring is displaced from the side close to the input terminal of the scanning voltage to the side distant therefrom, no problem is produced in general, even if the distortions in the waveform as described previously are produced. Specifically, when the delay time becomes long and the delay exceeds the application period of the scanning voltage, problems, which are similar to that by the line at a time scanning method, are produced.

In order to resolve these problems, in the first embodiment indicated in FIG. 1, a plurality of signal lines 3 are grouped in one set and the output of the signal side driving circuit 5 is applied to the display portion 1 in accordance with the delay time by means of a plurality of the voltage-timing transforming circuit 7 for every set.

Figure 5:
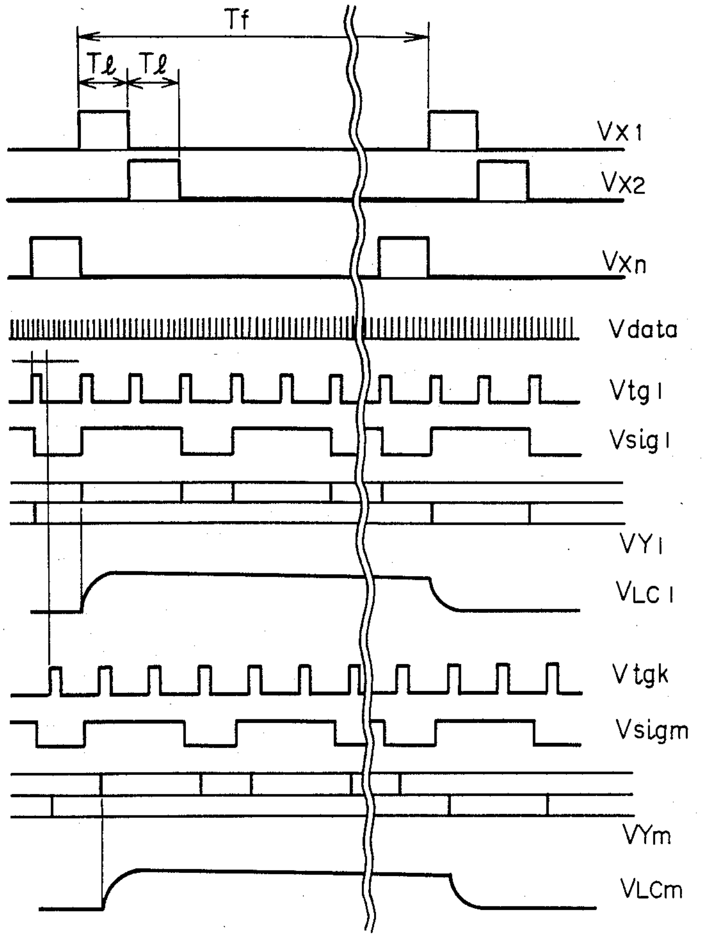
FIG. 5 is a scheme of waveform in principal parts of the device indicated in FIG. 1.

FIG. 5 shows the waveform in different portions in FIG. 1. The scanning voltage on each of the scanning lines $V_{x1}, V_{x2}, \ldots V_{xn}$ is waveform selecting (scanning) one of the scanning lines during l from period $T_f$ and the period of time for selecting one scanning line $T_l = T_f/n$. Here it can be supposed that $T_l = 41$ μsec, when $n = 400$ and $T_f = 60$ Hz.

The signal $V_{data}$ on the display data input line connected with the input terminal of the signal side driving circuit 5 can be either digital or analogue. When it is a digital signal, the signal side driving circuit 5 is constructed by combining shift registers with latch circuits. On the other hand, when it is an analogue signal, the signal side driving circuit 5 is constructed by combining sample hold circuits with analogue memories. Being so constructed, the signal side driving circuit 5 transforms display data signal $V_{data}$ in a serial representation into signal voltages $V_{sig1}, \ldots, V_{sigm}$ in a parallel representation.

In order to apply an alternative voltage to the liquid crystal, the transforming circuit 7 inverts the polarity of the signal voltages $V_{sig1}, \ldots, V_{sigm}$ for every frame and at the same time supplies each of the signal voltages to each of the signal lines with a required delay in accordance with the delay time of the scanning voltage at pixels on each of the scanning lines. The delay time of each of the transforming circuits is determined by the timing of one of timing pulses $V_{tg1}, \ldots, V_{tgk}$ coming from the timing generating circuit 8. This timing generating circuit 8 will be described later more in detail.

Signal voltages $V_{Y1}, \ldots, V_{Ym}$ are successively supplied from the transforming circuit 7 to the signal lines for every scanning period. On the other hand same signals $V_{LC1}, \ldots, V_{LCm}$ are held in the liquid crystal cells during a frame period. In this way, the display data are updated for every frame period and at the same time their polarity is inverted.

Figure 6:
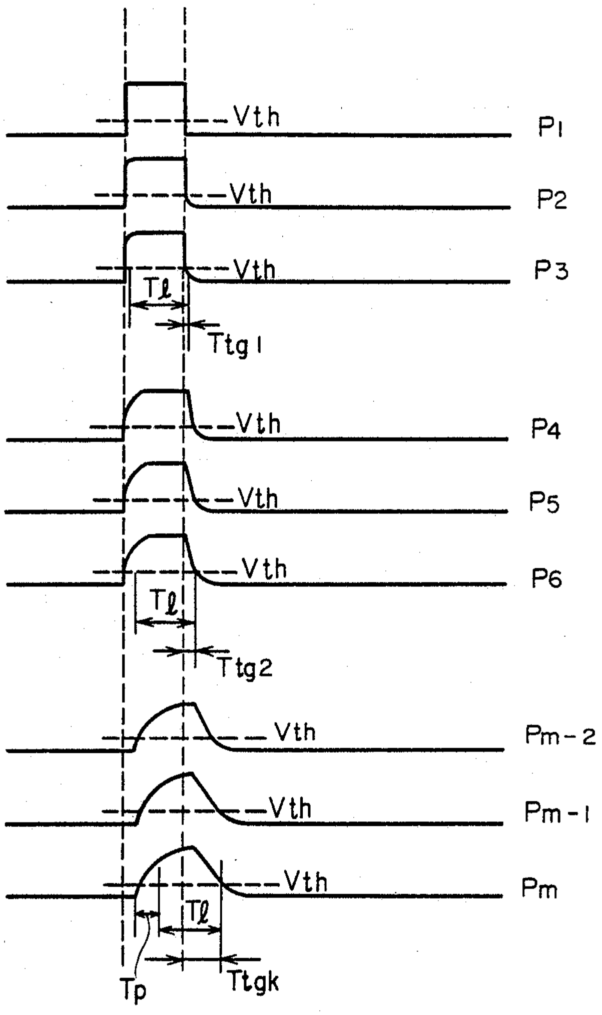
FIG. 6 is a scheme for explaining the relation between the distortions in the waveform of the scanning voltage and the timing of the feeding of the signal voltage.

Now the timing of the output of each of the transforming circuits 7 is explained, referring to FIG. 6. In the scanning voltage applied to the gate electrode of the pixels $p_1, p_2, p_3, \ldots, p_{m-1}, p_m$ connected with one of the scanning lines are produced distortions in the waveform with increasing distance from the input terminal of the scanning voltage for the reason described previously. The TFT elements are turned on, when the signal voltage exceeds their threshold voltage $V_{th}$, and the signal voltage is applied to the liquid crystal layer from the signal wiring. Consequently, if the signal voltage is applied in synchronism with the on-state of the TFT elements, it is possible to realize an excellent display. Therefore, when the on-state of the TFT elements is retarded due to the distortions in the waveform, it is sufficient to retard the timing of applying the signal voltage, corresponding to the retardation of the on-state of the TFT elements. Furthermore, since it is necessary that, when the TFT elements of a relevant line are turned off, the signal voltage of the following line is applied, the signal voltage of the following line is applied in synchronism with the timing, where the TFT elements of the relevant line are turned off. In this case, during a period $T_p$ of the pixel $p_m$ in FIG. 6, the voltage of the line preceding the relevant line by 1 is applied to the liquid crystal layer, but since the correct voltage is applied during $T_l$ and the display is effected normally, no problem is produced. Consequently, since the on-period of the TFT elements has a tendence to be longer with increasing delay of the scanning voltage, if the application period $T_l$ of the signal voltage is kept constant, it is easy to obtain the delay of the signal voltage.

In the first embodiment described above, since it is possible to apply the signal voltage to each of the rows in the optimum state, even if distortions in the waveform are produced in the scanning voltage, it is possible to reduce the inhomogeneity of display characteristics and to resolve the problem of erroneous display such as display of information belonging to another line.

Figure 7:
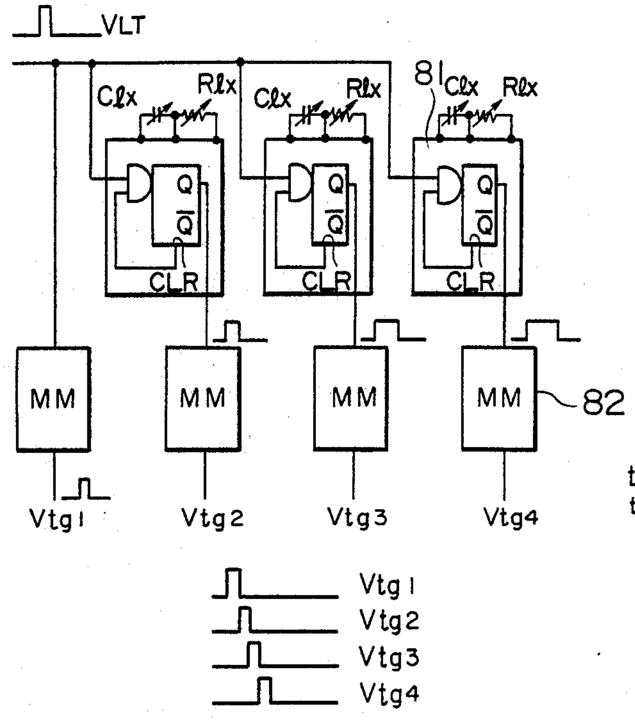
FIG. 7 is a block diagram indicating the construction of the timing generating circuit shown in FIG. 1 in detail.

FIG. 7 shows an example of the concrete circuit construction of the timing generating circuit 8. This changes the width of the output pulse by regulating artificially the value of a capacitor $C_{lx}$ and a resistor $R_{lx}$ mounted externally on the basis of experiences by means of a well-known one shot pulse generating circuit 81. This pulse makes a monostable multivibrator 81 generate timing pulses $V_{tg1}, \ldots, V_{tg2}$ having a predetermined width in synchronism of the rise of this pulse. The transforming circuit 7 feeds the signal wiring with the signal voltage retarded by the delay times $t_{d1}$, $t_{d2}$, $t_{d3}$ of this timing pulse.

Figure 8:
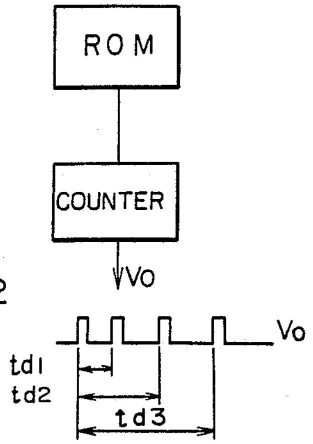
FIG. 8 is a scheme showing another embodiment of the same circuit.

FIG. 8 shows the construction of another embodiment, in which delay data are inputted previously in a memory and the delay times $t_{d1}$, $t_{d2}$, $t_{d3}$ are obtained by outputting a pulse train $V_0$ from a counter circuit. An advantage can be obtained by this construction that the delay times can be easily regulated, because they can be set by a software.

Figure 9:
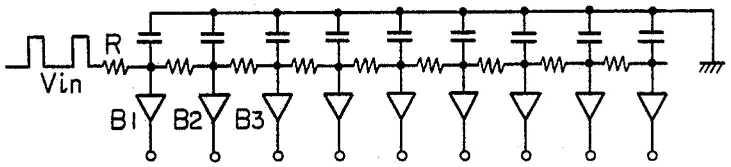
FIG. 9 is a scheme showing still another embodiment of the same circuit.

FIG. 9 illustrates an example, by which a separate circuit consisting of resistors R and capacitors C having the same constants as those of the wiring in the display portion is formed; an input voltage $V_{in}$, whose period is equal to that of the scanning voltage, is applied to this circuit; and the output of each of the stages is amplified by each of amplifier circuits $B_1, B_2, B_3, \ldots$, which is used for the delay of the timing in the application of the signal voltage. These amplifier circuits $B_1, B_2, \ldots$, amplifies it and regulates its waveform. It is also possible to determine the delay times by using resistors R and capacitors C having values proportional to those of the wiring in the display portion. This method has an advantage that the timing of the delay in the application of the signal voltage for the separate circuit can be set so as to be essentially equal to that of the display portion by fabricating the separate circuit in the same fabrication step as the display wiring, even if the values of the resistors R and the capacitors C vary due to differences in the fabrication process, etc.

Figure 10:
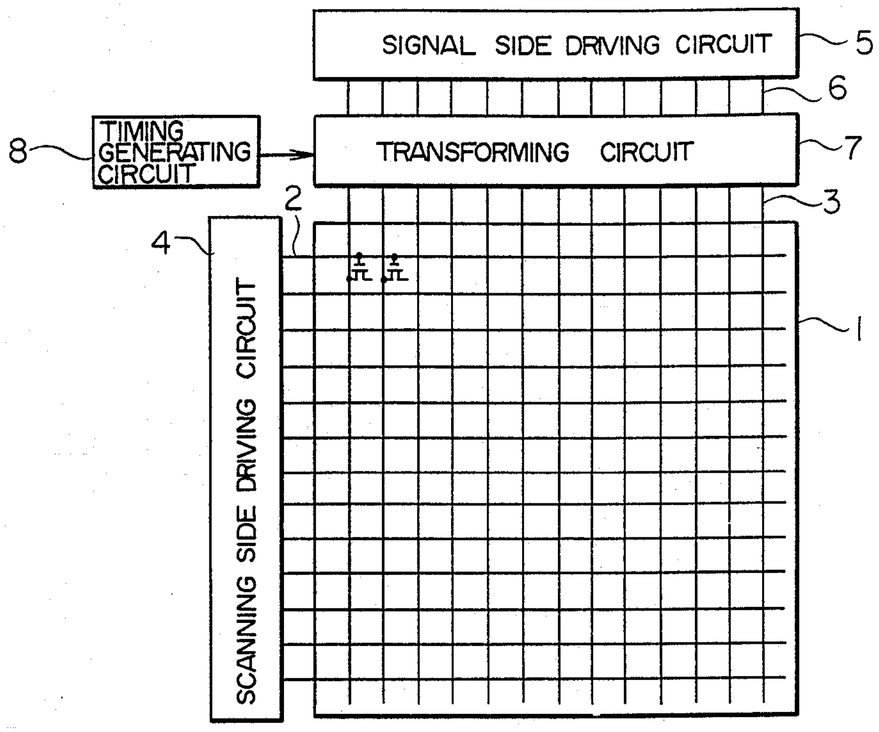
FIGS. 10, 11 and 12 are schemes showing three other embodiments of this invention.

The embodiment indicated in FIG. 10 is a modification of the embodiment indicated in FIG. 1. In the embodiment indicated in FIG. 1 all the signal lines are divided into a plurality of groups and each of the voltage-timing transforming circuits feeds each of the groups. To the contrary, in FIG. 10, all the signal lines constitute one circuit. That is, in the case where the distortions in the waveform are small in the whole display portion, the timing of the delay in the output of the voltage-timing transforming circuit 7 is determined so that it is in accordance with the delay time of the pixel having the greatest distortions in the waveform. By this method, in a prior art driving circuit according to the line at a time scanning method, it is possible to realize this invention without modifying considerably the circuit construction, because it is sufficient only to retard the timing of the output of the signal voltage with respect to the timing of the scanning voltage.

Figure 11:
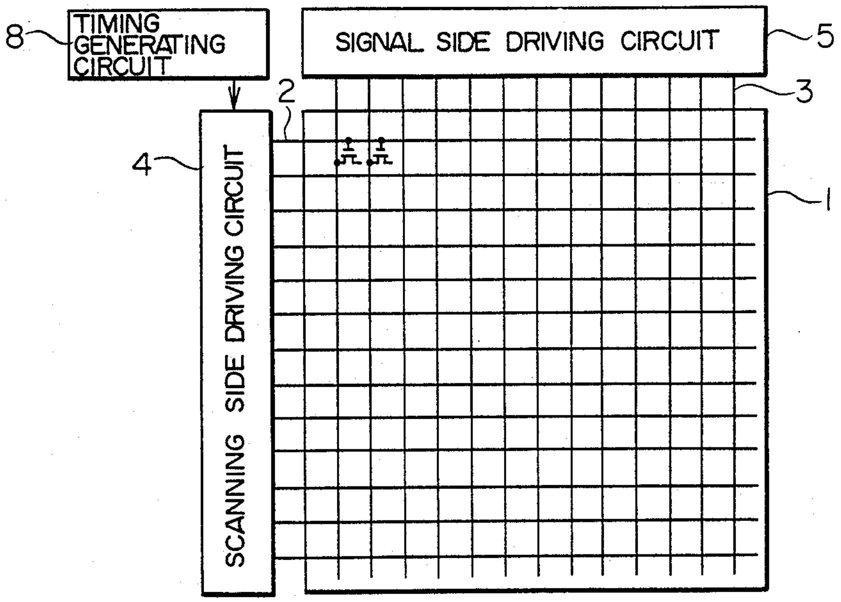

FIG. 11 illustrates a construction, by which, instead of delaying the output of the signal side circuit, the scanning voltage of the scanning is wholly advanced. In this case, the circuit 8 applies a voltage so as to advance the timing of the output of the scanning circuit 4. Since the same effect can be obtained, if the timing of the application of the scanning voltage and that of the signal voltage are different relatively from each other, in the case where it is easier to advance the phase of the scanning voltage, a larger effect can be obtained by this construction.

Figure 12:
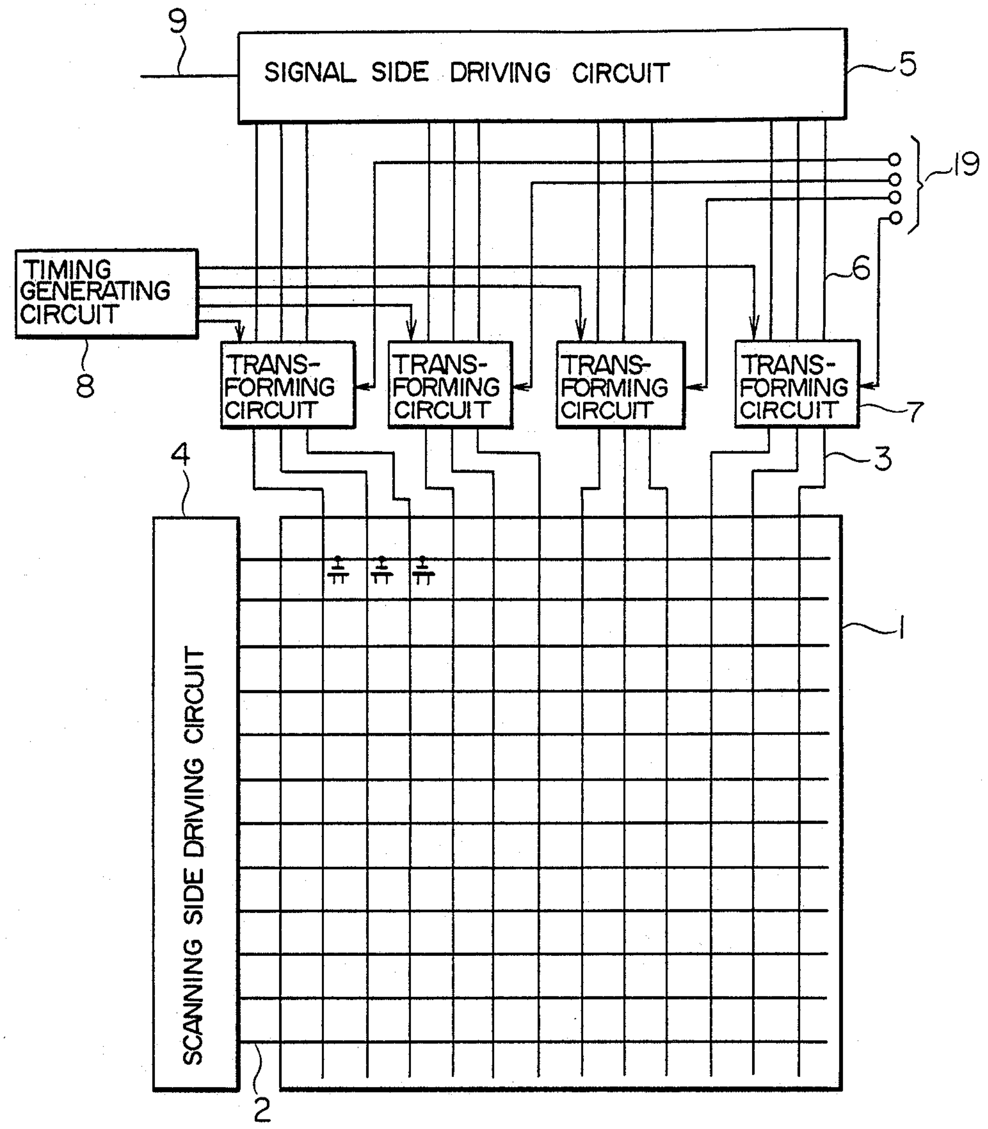

FIG. 12 illustrates a modified example of the embodiment indicated in FIG. 1. In this example a voltage input terminal for inputting a gain setting signal is disposed for each of the voltage-timing transforming circuit 7 and the level of the signal voltage is regulated for every circuit. Since distortions in the waveform of the scanning voltage are produced, what reduces more strongly the value of the scanning voltage for a pixel with increasing distance from the input terminal of the scanning voltage, and it happens that the signal voltage is held without being raised sufficiently by the signal voltage, in order to compensate this reduction of the voltage, the drain voltage of the TFT elements is increased. In this way it is possible to homogenize the display characteristics.

Figure 13:
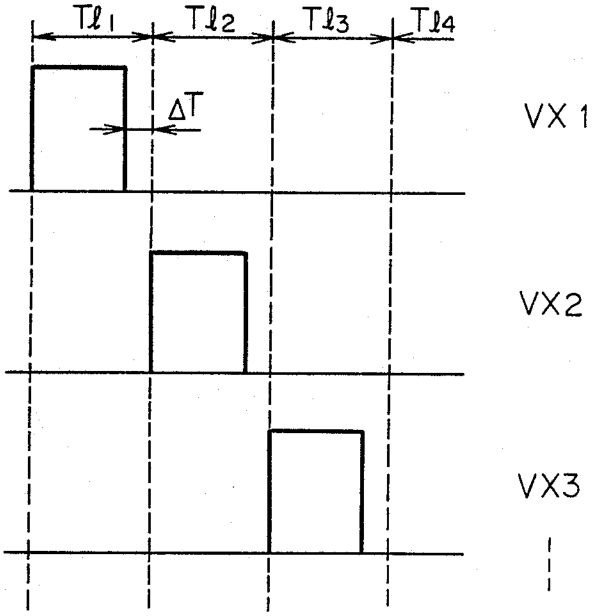
FIG. 13 is a scheme for explaining still another embodiment of this embodiment.

FIG. 13 shows a method permitting to avoid the phenomena that display data are shifted by influences of the distortions in the waveform in the scanning wiring. That is, in order to eliminate influences of the fact that the distortions in the waveform are produced and in particular the fall time of the waveform is elongated, a pause period Δt, during which no scanning voltage is applied, is disposed within the application time $Tl_1$, $Tl_2$, $Tl_3$, . . . for each of the scanning lines. This pause period is a period of time corresponding $T_0$ the maximum delay time of the scanning voltage. In this way, even if the fall time of the waveform is elongated, it is possible to eliminate the superposition of the signal voltage in a line on that in the following line and to avoid the phenomena that display data are shifted.

According to this invention, since it is possible to apply the signal voltage, whose timing is regulated in accordance with the distortions in the waveform, an effect can be obtained that it is possible to realize a display device having a large screen area with excellent display qualities.

We claim:

1. A display device comprising:
- a plurality of scanning electrodes arranged in parallel to each other;
- a plurality of signal electrodes arranged in parallel to each other, which intersect with said plurality of scanning electrodes;
- a plurality of display elements, each of which is disposed at each of the intersections of said plurality of signal electrodes with said plurality of scanning electrodes;
- a scanning side driving circuit applying successively a scanning voltage to said plurality of scanning electrodes;
- a signal side driving circuit applying a signal voltage to said plurality of signal electrodes, corresponding to said scanning voltage;
- switching elements, each of which is disposed at each of the intersections of said plurality of signal electrodes with said plurality of scanning electrodes and controls the feeding of said plurality of display elements with said signal voltage, depending on said scanning voltage; and
- signal regulating means, which retards the timing of applying said signal voltage applied to at least a part of said signal electrodes relative to the timing of applying said scanning voltage applied to said scanning electrodes, including means for retarding the timing of applying said signal voltage applied to a part of said signal electrodes, which are distant from the input terminal of the scanning voltage applied to said scanning electrodes from said scanning side driving circuit relative to the timing of applying said scanning voltage applied to said scanning electrodes.

2. A display device according to claim 1, wherein said signal electrodes are divided into a plurality of groups and said signal regulating means includes means for retarding more the timing of applying said signal voltage applied to a group of said signal electrodes with increasing distance from the input terminal of the scanning voltage.

3. A display device according to claim 2, wherein said signal regulating means includes a plurality of delaying circuits corresponding to said plurality of groups and timing generating means for generating timing signals determining a required delayed timing for each of said plurality of delaying circuits.

4. A display device according to claim 3, wherein said timing generating means includes a plurality of monostable multivibrators generating pulses having different widths, receiving an inputted pulse and means for generating said timing signal at the end of a pulse outputted by each of said monostable multivibrators.

5. A display device according to claim 3, wherein said timing generating means includes a memory, in which delay data are previously inputted, and means for generating a plurality of timing signals on the basis of said delay data.

6. A display device according to claim 1, wherein said signal regulating means includes delaying means for retarding the timing of applying said signal voltage applied to at least a part of said signal electrodes and timing generating means for giving said delaying means a required delayed timing.

7. A display device according to claim 6, wherein said timing generating means includes a circuit, which is essentially identical to the equivalent circuit of one of said scanning electrodes, and means for drawing out timing signals from the connecting point of said circuit.

8. A display device according to claim 6, wherein said timing generating means includes wiring made in the same fabrication step as that of the scanning wiring and means for drawing out the delay time produced in the wiring as said timing signals.

9. A display device according to claim 1, wherein said signal regulating means includes a circuit, which is essentially identical to the equivalent circuit of one of said scanning electrodes, and means for retarding the timing of applying said signal voltage applied to at least a part of said signal electrodes on the basis of delay time produced in said circuit.

10. A display device according to claim 1, wherein said signal regulating means includes further means for increasing the magnitude of the signal voltage applied to at least a part of said signal electrodes, which are distant from the input terminal of said scanning voltage.

* * * * *